United States Patent
Chazal et al.

(10) Patent No.: US 11,498,570 B2
(45) Date of Patent: Nov. 15, 2022

(54) METHOD AND SYSTEM FOR REAL-TIME ESTIMATION OF ROAD CONDITIONS AND VEHICLE BEHAVIOR

(71) Applicant: COMPAGNIE GENERALE DES ETABLISSEMENTS MICHELIN, Clermont-Ferrand (FR)

(72) Inventors: Guillaume Chazal, Clermont-Ferrand (FR); Antoine Paturle, Clermont-Ferrand (FR); Remi Cote, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 73 days.

(21) Appl. No.: 16/497,231

(22) PCT Filed: Mar. 22, 2018

(86) PCT No.: PCT/EP2018/057307
§ 371 (c)(1),
(2) Date: Sep. 24, 2019

(87) PCT Pub. No.: WO2018/172464
PCT Pub. Date: Sep. 27, 2018

(65) Prior Publication Data
US 2020/0324779 A1    Oct. 15, 2020

Related U.S. Application Data

(60) Provisional application No. 62/475,941, filed on Mar. 24, 2017.

(51) Int. Cl.
*B60W 40/06* (2012.01)
*G06V 20/56* (2022.01)
*G08G 1/0967* (2006.01)

(52) U.S. Cl.
CPC .......... *B60W 40/06* (2013.01); *G06V 20/56* (2022.01); *G08G 1/096708* (2013.01); *B60W 2420/54* (2013.01)

(58) Field of Classification Search
CPC .......... B60W 40/06; B60W 2420/54; B60W 2050/0057; B60W 2420/40; G06K 9/00791; G08G 1/096708; G01N 29/04
See application file for complete search history.

(56) References Cited

U.S. PATENT DOCUMENTS

| | | | |
|---|---|---|---|
| 9,187,097 B2 * | 11/2015 | Levin | B60W 30/18145 |
| 9,207,323 B2 * | 12/2015 | Zhu | G01S 17/66 |
| 10,365,248 B2 | 7/2019 | Paturle et al. | |
| 10,414,405 B2 | 9/2019 | Duvernier et al. | |
| 2003/0191568 A1 * | 10/2003 | Breed | B60W 40/06 701/36 |
| 2004/0138831 A1 | 7/2004 | Watanabe | |
| 2007/0174002 A1 * | 7/2007 | Kitazaki | B60T 8/172 701/70 |
| 2008/0243348 A1 * | 10/2008 | Svendenius | B60T 8/172 702/41 |
| 2011/0109448 A1 * | 5/2011 | Browne | B60Q 9/00 340/604 |
| 2013/0116972 A1 | 5/2013 | Hanatsuka et al. | |
| 2013/0211621 A1 * | 8/2013 | Breuer | B60T 8/172 701/1 |
| 2015/0153266 A1 | 6/2015 | Mack | |
| 2015/0344037 A1 | 12/2015 | Siegel et al. | |
| 2015/0375753 A1 | 12/2015 | Schrabler et al. | |
| 2016/0349219 A1 | 12/2016 | Paturle et al. | |
| 2017/0089710 A1 * | 3/2017 | Slusar | G01C 21/3492 |
| 2018/0170391 A1 | 6/2018 | Duvernier et al. | |

FOREIGN PATENT DOCUMENTS

| | | |
|---|---|---|
| DE | 102012024874 A1 | 6/2014 |
| DE | 102013002333 A1 | 8/2014 |
| FR | 3015036 A1 | 6/2015 |
| JP | H-06174543 A * | 12/1992 |
| NO | 2016/185030 A2 | 11/2016 |

OTHER PUBLICATIONS

Translation of FR 3015036 (Year: 2015).*
Translation of JPH 06174543A (Year: 1992).*
International Search Report dated Jun. 14, 2018, in corresponding PCT/EP2018/057307 (3 pages).

* cited by examiner

*Primary Examiner* — Sze-Hon Kong
*Assistant Examiner* — Daniel Tyler Reich
(74) *Attorney, Agent, or Firm* — Venable LLP

(57) ABSTRACT

A method for determining a road condition is carried out aboard a vehicle driving on the road and comprises the following steps: capturing the noise created by the friction between at least one tire and the road; analyzing the noise signal in the high frequency range to determine whether the road condition is dry or not; and, in case the road condition is not dry, analyzing the noise signal in the low frequency range to determine whether to road condition is wet or damp.

10 Claims, No Drawings

METHOD AND SYSTEM FOR REAL-TIME ESTIMATION OF ROAD CONDITIONS AND VEHICLE BEHAVIOR

FIELD OF THE INVENTION

With the growing development of autonomous vehicles and advanced driver assistance systems (ADAS), it has become highly useful for a vehicle to get some information regarding the friction that exists between the vehicle tires and the road, at every moment.

Indeed, this friction information may have some impacts on the driving rules that are provided to some actuating systems of the vehicle.

The friction level depends on the tire itself, its wear, pressure . . . but it also depends on road conditions, and more particularly on weather conditions of the road.

Nowadays, few sensors are able to provide weather information of the road, at a low cost, and relatively accurately. For example, some solutions carry out a microphone, set up on the vehicle, for recording the noise of the tire on the road. Based on this record, it seems possible to analyze the capture information to get some input of the weather condition of the road. However, in existing systems, the information provided by the microphone is discreet, and does not allow to discriminate more than between a wet road and a dry road.

Such system is also used, in the state of the art, for determining the road texture and the tire wear. However, the drawbacks above mentioned also appear in those applications.

Other systems carry out technologies like optical cameras to determine weather conditions, but it appears that these solutions cannot provide accurate information in all conditions, namely in shadow or dark-light conditions.

Accordingly, the present invention aims at providing a method and a system for avoiding the above-mentioned drawbacks.

SUMMARY OF THE INVENTION

More precisely, the present invention aims at providing a system and a method that allows determining a road condition and a vehicle behavior on such road. Thus, one goal of the invention is to determine the friction coefficient between the tire and the road in an accurate way, whatever the level of water on the road. Another goal is to determining the braking distance on the vehicle in different weather conditions.

DETAILED DESCRIPTION OF THE INVENTION

As explained before, existing methods carry out a discreet approach which does not permit to determine road conditions with a precision degree higher than just dry/wet.

Indeed, we have noticed by some experiments that it might possible to discriminate between three different types of road conditions, having direct consequences on the friction and the braking distance:
  a wet condition, where the aquaplaning takes place and the braking distance can be really high (physical phenomena: hydroplaning; braking distance: water height dependent),
  a damp condition, where the road is still saturated with water but not enough to have aquaplaning, and where the adherence is still not dry (physical phenomena: thin water film at the surface preventing dry contact; braking distance: water height dependent), and
  a dry condition (physical phenomena: dry; braking distance: constant).

Thus, the invention relates to a method for determining a road condition, the method being carried out aboard a vehicle driving on the road, and the method comprising the following steps:
  Capturing the noise created by the friction between at least one tire and the road,
  Analyzing the noise signal in the high frequency range to determine whether the road condition is dry or not,
  In case the road condition is not dry, analyzing the noise signal in the low frequency range to determine whether to road condition is wet or damp The output of the noise capture is a spectrum, which can then be analyzed. This analysis makes it possible to determine the following method steps for discriminating between the different road conditions:

Step 1: Analyze the noise signal in the high frequency range to determine whether the road is "dry", or "not dry". Indeed, as can be seen in the graphs above, the "dry condition", corresponding to the bottom part of the spectrum, can easily be discriminated by applying a first predetermined threshold on the amplitude of the signal.

Step 2: In case the condition is "not dry", then analyze the noise signal in the low frequency range, to determine whether the condition is "wet" (top part of the spectrum) or "damp" (middle part of the spectrum), by applying a second predetermined threshold on the amplitude of the signal.

The first and second thresholds are predetermined based on several parameters, namely the speed of the vehicle.

In one specific embodiment, a method according to the invention includes a step of determining a friction coefficient between the tires and the road, based on the determined road conditions, and optionally on other parameters such as the vehicle speed and/or the wear of the tire.

In another specific embodiment, a method according to the invention includes a step of determining a braking distance of the vehicle on the road, based on the determined road conditions and optionally on other parameters such as the vehicle speed and/or the wear of the tire.

In one specific embodiment, a method according to the invention includes a step of determining a maximum lateral speed of the vehicle based on the determined road conditions, and optionally on other parameters such as the wear of the tire.

Then, it appears that in some cases, it might be useful to robustify and/or refine the preceding determination. As an example, it can be seen on the first figure that in the damp or wet conditions, the braking distance may depend on the water height on the road. Thus, it might be useful to enhance the claimed method by additional steps as follows:

In an embodiment, a method according to the invention may include a step, consisting in analyzing images issued from a camera, by applying image processing methods, for example edge detection methods, carrying out filters like Sobel Filter. The results of such analysis can be used to confirm and/or refine the determination made by using the acoustic sensor.

In another embodiment, a laser oriented towards the ground may allow to know the amount of water on the ground, and then to discriminate between the damp and dry conditions. Technologies like triangulation or self-mixing may be used to do so.

Another option again would be to use data from weather provided by external sources. Indeed, specific actors in this domain may provide data that include:
quantity of water that has fallen,
estimation of the water film thickness on the road, knowing certain parameters (GPS coordinates, traffic, temperature . . . ).

Knowing this data, and applying a predetermined model, it would be possible to derive the amount of water really present on the road, and then to refine the characterization of a vehicle behavior on the road.

Another option for determining the water film thickness is to use a sensor based on infra-red spectroscopy, placed on the roof of the vehicle.

The present invention also concerns a system for determining a road condition, the system comprising:
At least one microphone installed on the body of a vehicle,
At least one camera installed in or on the vehicle,
At least one processor unit for analyzing data issued from the microphone and the camera.

In a specific embodiment, the microphone is installed close the at least one tire of the vehicle. Preferably, the microphone is installed close to a rear tire of the vehicle.

In a specific embodiment, the camera is installed in such a location that it can capture the road forward, before the vehicle rolls over it.

Such system would make it possible to correlate data measured by these two sensors to have a precise discrimination of the road conditions:
an acoustic sensor for discriminating between the three road conditions, and
an optical sensor for confirming and/or refining the results of the discrimination made by using the acoustic sensor.

The acoustic sensor is, for example, a microphone, integrated on the vehicle, very close to the tire so that the noise recorded actually reflects the condition of the road. The system may also include two microphones, one installed close to a front wheel, and one close to a rear wheel of the vehicle.

The optical sensor may be a camera or a laser.

Such system can also be used to carry out any method based on both an acoustic signal and an image signal.

Indeed, the noise processing can be done as previously explained, by analyzing the signal amplitude in different frequency ranges, but other options may be considered for discriminating the road conditions based on this signal.

Thus, the scope of the invention may not be limited to a system for carrying out the method steps herein described, but may cover any systems as claimed.

The invention claimed is:

1. A method for determining a road condition, the method (a) being carried out aboard a vehicle having tires and driving on a road, and (b) comprising:
capturing, using an acoustic sensing system comprising a microphone, a noise signal created by friction between at least one tire and the road;
analyzing, by a processor, the noise signal, to discriminate between (a) a dry road condition, (b) a damp road condition, and (c) a wet road condition, and
determining a friction coefficient between the tires and the road, based on the discrimination between (a) the dry road condition, (b) the damp road condition, and (c) the wet road condition,
wherein the analyzing comprises (1) a first analyzing, by the processor, of the noise signal in a first predetermined frequency range to determine whether the road condition is dry or not, the first analyzing comprising applying a first predetermined threshold to an amplitude of the noise signal in the first predetermined higher frequency range; and (2) when the road condition is not dry, a second analyzing, by the processor, of the noise signal in a second predetermined frequency range having a frequency range lower than that of the first predetermined frequency range to determine whether the road condition is wet or damp, the second analyzing comprising applying a second predetermined threshold to an amplitude of the noise signal in the second predetermined frequency range.

2. The method according to claim 1, further comprising determining a braking distance of the vehicle on the road, based on the discrimination between (a) the dry road condition, (b) the damp road condition, and (c) the wet road condition.

3. The method according to claim 2, wherein the determining the braking distance is further based on parameters including vehicle speed and tire wear.

4. The method according to claim 1, further comprising determining a maximum lateral speed of the vehicle based on the discrimination between (a) the dry road condition, (b) the damp road condition, and (c) the wet road condition.

5. The method according to claim 4, wherein the determining the maximum lateral speed is further based on parameters including vehicle speed and tire wear.

6. The method according to claim 1, further comprising:
capturing an image of the road using an optical sensor;
analyzing the image to determine whether some part of the image exhibits different colors; and
based on the analyzing the image, confirming the discrimination between (a) the dry road condition, (b) the damp road condition, and (c) the wet road condition or revising the discrimination between (a) the dry road condition, (b) the damp road condition, and (c) the wet road condition.

7. The method according to claim 1, further comprising:
obtaining information regarding a weather condition on the road from an external source; and
analyzing the information regarding weather condition to confirm or to revise the discrimination between (a) the dry road condition, (b) the damp road condition, and (c) the wet road condition.

8. The method according to claim 1, further comprising using at least one camera installed in or on the vehicle to revise the discrimination between (a) the dry road condition, (b) the damp road condition, and (c) the wet road condition.

9. The method according to claim 1, wherein the determining the friction coefficient is further based on parameters including vehicle speed and tire wear.

10. The method according to claim 1, further comprising using an infrared spectroscopy sensor to determine water film thickness.

* * * * *